[91.]

A. W. BUNNELL.
Lock-Nut for Bolts.

No. 118,685.          Patented Sep. 5, 1871.

Witness
A B Richmond
Geo. O. Morgan

Inventor
Aaron Whited Bunnell

UNITED STATES PATENT OFFICE.

AARON WHITED BUNNELL, OF LINEVILLE, PENNSYLVANIA.

IMPROVEMENT IN LOCK-NUTS.

Specification forming part of Letters Patent No. 118,685, dated September 5, 1871.

*To all whom it may concern:*

Be it known that I, AARON WHITED BUNNELL, of Lineville, in the county of Crawford, State of Pennsylvania, have invented a new and Improved Lock-Nut for Screw-Bolts; and I do hereby declare that the following is a full and exact description of the same, reference being had to the accompanying drawing and the letters of reference marked thereon.

The object of my invention is to construct a screw-bolt and lock-nut that will not unscrew by the jar of machinery or any other cause.

Figure 1:
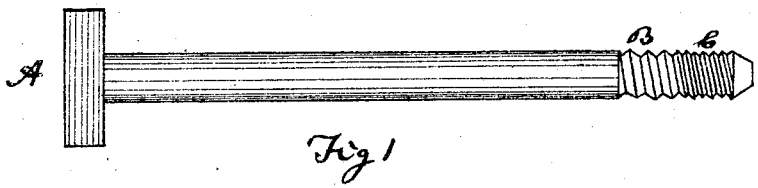

A, Figure 1, represents the screw-bolt at the screw end. One-half of the screw at B is cut with a coarse thread and the other part, C, with a fine screw. The screw-shaft is a little smaller at the fine thread so that the first nut will slip over the fine thread.

Figure 2:
Figure 2:
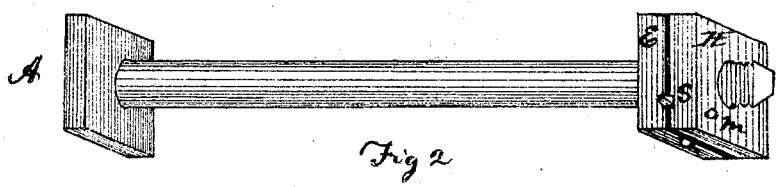

Fig. 2 shows the bolt, with the nut in place. Through the corner of the nuts E and H is a key-seat, S, in which the spring-key D is placed.

Its operation is as follows, to wit: The bolt is put in place and the nut E with the coarse thread is "turned home," and the nut H with the fine thread is turned on top down on E, and the key D placed in the seat. This securely locks the nuts, and even if the key D is drawn out and the nuts E and H commence to turn, the nut E with the coarse thread will travel so much faster than H that it will catch it and bind it.

A key might be run through a hole in the nut H and E, shown at *m*, instead of D.

What I claim as my invention, and desire to secure by Letters Patent, is as follows, to wit:

1. A bolt, with two screw-nuts, constructed as described, one with a coarse and the other with a fine thread.

2. The said nuts, in combination with the key D, constructed as described, for the purposes set forth.

AARON WHITED BUNNELL.

Witnesses:
 A. B. RICHMOND,
 GEO. O. MORGAN.